(12) United States Patent
Viswanathan et al.

(10) Patent No.: US 8,479,290 B2
(45) Date of Patent: Jul. 2, 2013

(54) TREATMENT OF MALICIOUS DEVICES IN A MOBILE-COMMUNICATIONS NETWORK

(75) Inventors: Harish Viswanathan, Morristown, NJ (US); Dimitrios Stiliadis, Morganville, NJ (US)

(73) Assignee: Alcatel Lucent, Paris (FR)

( * ) Notice: Subject to any disclaimer, the term of this patent is extended or adjusted under 35 U.S.C. 154(b) by 378 days.

(21) Appl. No.: 12/816,439

(22) Filed: Jun. 16, 2010

(65) Prior Publication Data
US 2011/0314542 A1 Dec. 22, 2011

(51) Int. Cl.
*G06F 11/00* (2006.01)

(52) U.S. Cl.
USPC ............... 726/23; 726/26; 726/24; 370/352; 370/349

(58) Field of Classification Search
USPC ............... 726/26, 23, 24; 370/352, 349, 389
See application file for complete search history.

(56) References Cited

U.S. PATENT DOCUMENTS

| | | | |
|---|---|---|---|
| 7,295,831 B2 | 11/2007 | Coleman et al. | |
| 7,496,962 B2 | 2/2009 | Roelker et al. | |
| 7,565,693 B2 | 7/2009 | Shin et al. | |
| 7,640,585 B2 | 12/2009 | Lee et al. | |
| 7,701,945 B2 | 4/2010 | Roesch et al. | |
| 7,835,341 B2 * | 11/2010 | Inujima et al. | 370/349 |
| 8,019,349 B2 * | 9/2011 | Noda et al. | 455/445 |
| 2006/0212549 A1 * | 9/2006 | Hokkyo et al. | 709/220 |
| 2006/0276173 A1 | 12/2006 | Srey et al. | |
| 2007/0002838 A1 * | 1/2007 | Komura et al. | 370/352 |
| 2007/0006312 A1 * | 1/2007 | Li et al. | 726/24 |
| 2007/0232265 A1 * | 10/2007 | Park et al. | 455/410 |
| 2008/0056238 A1 * | 3/2008 | Inujima et al. | 370/352 |
| 2008/0214171 A1 * | 9/2008 | An | 455/418 |
| 2010/0002606 A1 * | 1/2010 | Preis et al. | 370/259 |
| 2010/0011029 A1 * | 1/2010 | Niemel | 707/200 |
| 2010/0050261 A1 * | 2/2010 | Park | 726/24 |

(Continued)

FOREIGN PATENT DOCUMENTS

WO    WO2006126089 A1    11/2006

OTHER PUBLICATIONS

Notification of Transmittal of the International Search Report and the Written Opinion of the International Searching Authority, or the Declaration; Mailed Aug. 4, 2001, for corresponding PCT Application No. PCT/US2011/039251.
3GPP TS 23.401 V9.4.0 (Mar. 2010) Technical Specification (258 pages).
3G Mobile Network Security, White Paper, Jan. 2007, iGillotResearch, Inc., pp. 1-15.

(Continued)

*Primary Examiner* — Beemnet Dada
*Assistant Examiner* — Sayed Beheshti Shirazi
(74) *Attorney, Agent, or Firm* — Mendelsohn, Drucker and Associates, P.C.; Yuri Gruzdokov; Steve Mendelsohn

(57) ABSTRACT

A method of remotely treating malicious mobile terminals connected to a mobile communications network. In one embodiment, when a malicious mobile terminal is detected by the intrusion-detection services of the network, the network changes the subscriber profile associated with the mobile terminal to operate the latter in a quarantine mode. The packet-switched subsystem of the network then links the quarantined mobile terminal to a remediation manager. The remediation manager remotely treats the mobile terminal, e.g., to repair or reinstall any corrupted software, terminate any active malicious processes, delete or quarantine any malware, and restore the operating system, configuration, and/or memory of the mobile terminal to a clean operational state. After the treatment, the network reverts the subscriber profile back to the initial state and removes the mobile terminal from the quarantine.

17 Claims, 2 Drawing Sheets

U.S. PATENT DOCUMENTS

| | | | | |
|---|---|---|---|---|
| 2010/0154060 A1* | 6/2010 | Demblewski | | 726/24 |
| 2010/0154062 A1* | 6/2010 | Baram et al. | | 726/24 |
| 2010/0216476 A1* | 8/2010 | Gupta et al. | | 455/445 |
| 2010/0306827 A1* | 12/2010 | Esteve Balducci et al. | | 726/4 |
| 2011/0107424 A1* | 5/2011 | Singh et al. | | 726/24 |
| 2011/0134830 A1* | 6/2011 | Lin | | 370/328 |

OTHER PUBLICATIONS

Scarfone, Karen et al., "Guide to Intrusion Detection and Prevention Systems (IDPS)," Recommendations of the National Institute of Standards and Technology, NIST Special Publication 800-94, Feb. 2007, pp. 1-127.

* cited by examiner

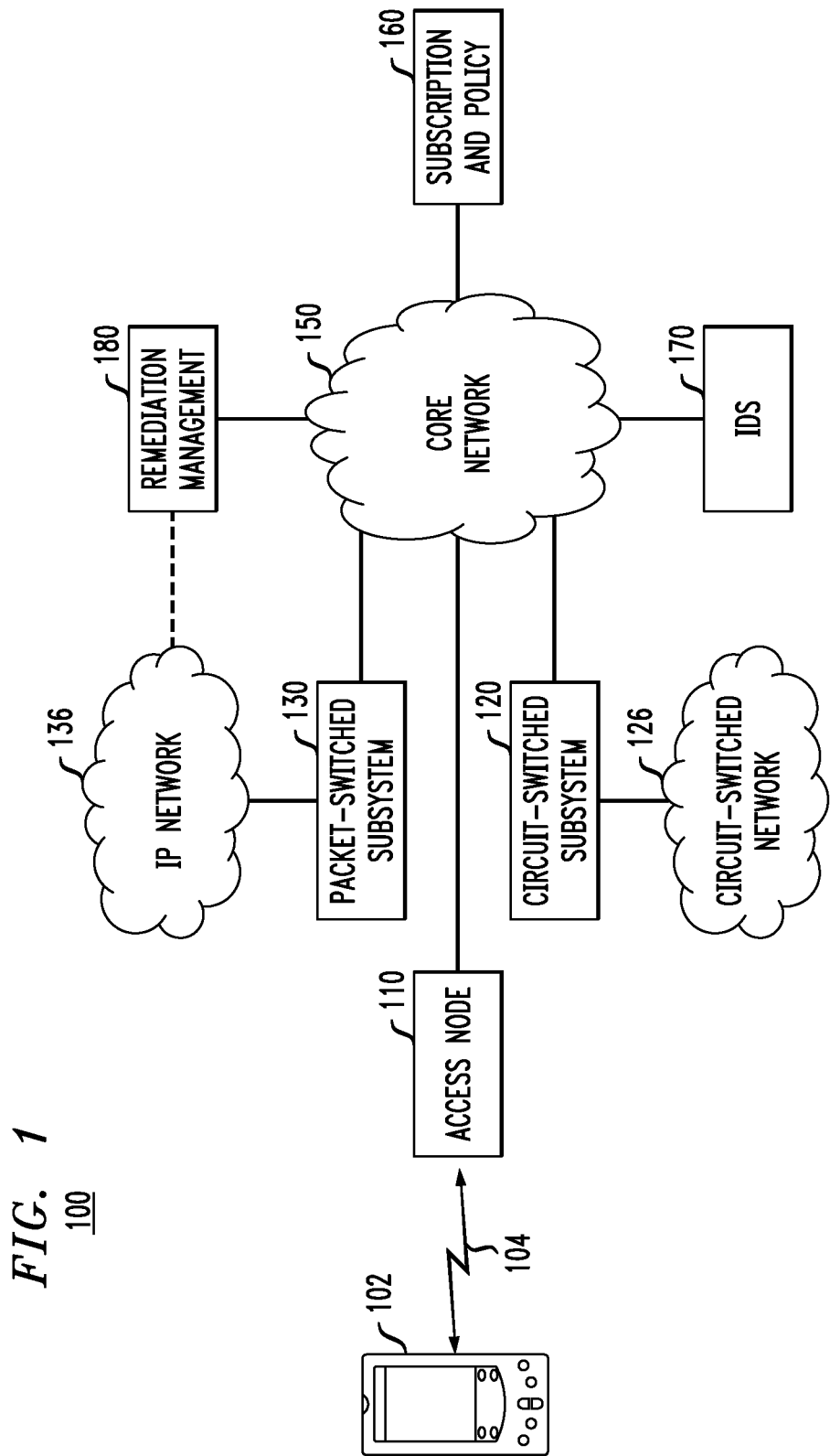

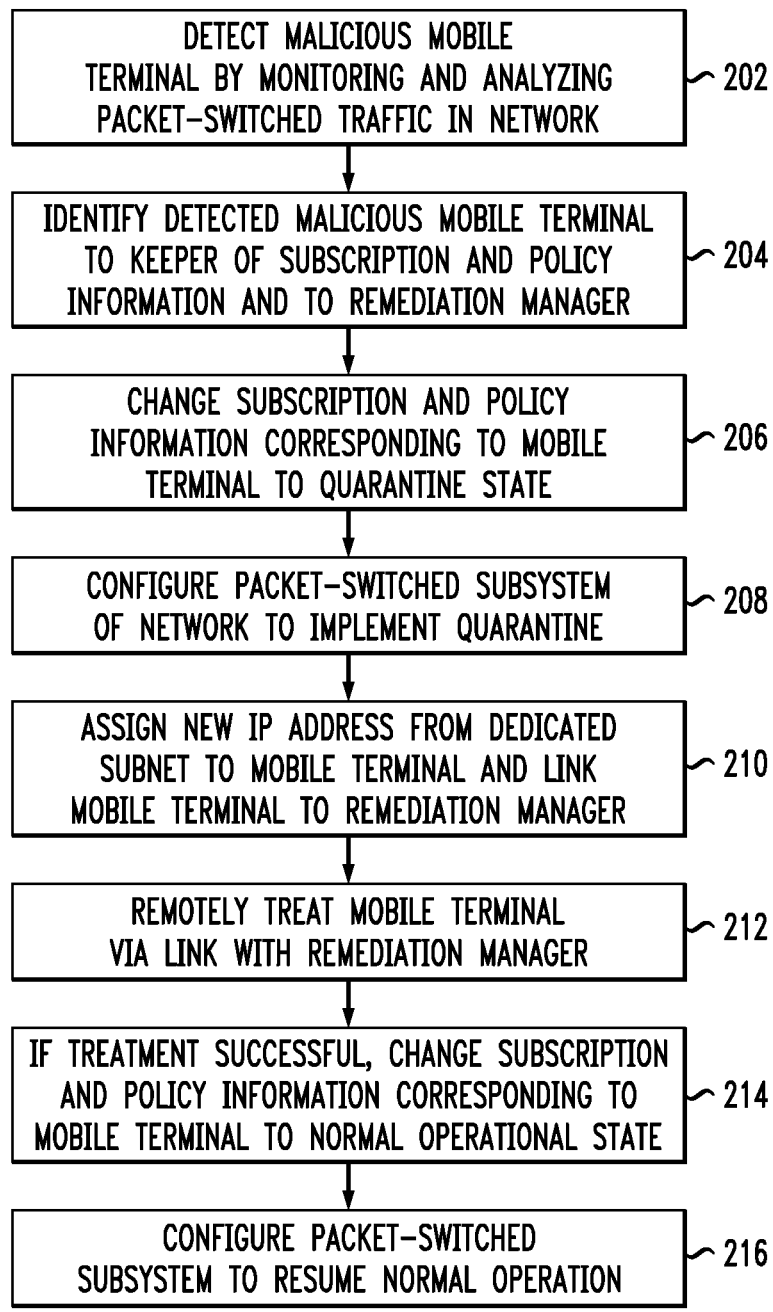

TREATMENT OF MALICIOUS DEVICES IN A MOBILE-COMMUNICATIONS NETWORK

BACKGROUND

1. Field of the Invention

The present invention relates to communication equipment and, more specifically but not exclusively, to equipment for mobile-communications systems/networks.

2. Description of the Related Art

This section introduces aspects that may help facilitate a better understanding of the invention(s). Accordingly, the statements of this section are to be read in this light and are not to be understood as admissions about what is in the prior art or what is not in the prior art.

With the advent of mobile broadband, laptops, personal digital assistants, smart phones, and other mobile devices have acquired the capability of communicating with the Internet over mobile-communications networks. Due to this capability, mobile operators have become internet-service providers (ISPs) in addition to functioning in their traditional role of providing cellular voice services. As a result, mobile-communications networks are now exposed to many of the same virtual pathogens, such as viruses, worms, and Trojans, with which the wired ISPs have been dealing for a long time. In addition, 2.5G/3G/4G mobile-communications networks are targeted by pathogen strains that are specifically designed to exploit certain vulnerabilities in the architecture and/or protocols used in wireless networks.

The presence of an infected and/or misbehaving mobile device in a mobile-communications network can be detected, e.g., through intrusion-detection services. The term "intrusion detection" generally refers to a process of monitoring relevant events that occur in a network or computer system and analyzing these events for signs of possible anomalies or irregularities, such as actual violations or imminent threats of violation of security policies, use policies, and/or standard security practices. Anomalies and irregularities may have many different causes, such as malware activity, unauthorized access to the system(s) from the Internet, misuse of privileges by authorized users, and attempts to gain additional privileges without proper authorization.

Malware activity and propagation can be particularly damaging because malware can subject the communication system to a variety of attacks, such as distributed denial of service, overbilling, and spoofed PDP (Packet Data Protocol) context. The impact of a successful attack on a mobile-communications network can be very costly due to one or more of: (1) interrupted voice, data, and/or application service; (2) lost billable time; (3) lost goodwill and increased customer dissatisfaction; (4) increased volume of customer-service calls; and (5) legal ramifications, e.g., stemming from a compromised database of private subscriber information. It is therefore important to timely isolate and treat malicious mobile devices. However, the currently available treatment options are very limited and include, e.g., bringing the implicated device to a service location or a store for an on-site treatment.

SUMMARY

Disclosed herein are various embodiments of a method of remotely treating malicious mobile terminals connected to a mobile communications network. In one embodiment, when a malicious mobile terminal is detected by the intrusion-detection services of the network, the network changes the subscriber profile associated with the mobile terminal to operate the latter in a quarantine mode. The packet-switched subsystem of the network then links the quarantined mobile terminal to a remediation manager. The remediation manager remotely treats the mobile terminal, e.g., to repair or reinstall any corrupted software, terminate any active malicious processes, delete or quarantine any malware, and restore the operating system, configuration, and/or memory of the mobile terminal to a clean operational state. After the treatment, the network reverts the subscriber profile back to the initial state and removes the mobile terminal from the quarantine.

According to one embodiment, provided is a communication method having the steps of: (A) monitoring packet-based traffic in a mobile-communications network to identify, as a malicious wireless terminal, a wireless terminal that exhibits specified behavior; (B) changing a subscriber profile maintained by the network for the wireless terminal to a quarantine state in response to the identification; and (C) allowing the wireless terminal to operate in the quarantine state under the changed subscriber profile.

According to another embodiment, provided is a mobile-communications network comprising one or more access nodes for wirelessly connecting one or more wireless terminals to the network; a packet-switched subsystem adapted to transport packet-based traffic corresponding to the one or more wireless terminals; an intrusion-detection-services (IDS) unit configured to monitor the packet-based traffic to identify wireless terminals that exhibit specified behavior; a subscription-and-policy unit configured to maintain a plurality of subscriber profiles; and a core network that operatively couples the one or more access nodes, the packet-switched subsystem, the IDS unit, and the subscription-and-policy unit. In response to the IDS unit identifying a wireless terminal that exhibits specified behavior, the subscription-and-policy unit is configured to change a subscriber profile maintained therein for the identified wireless terminal to a quarantine state. The packet-switched subsystem is configured to allow the identified wireless terminal to operate in the quarantine state under the changed subscriber profile.

According to yet another embodiment, provided is a communication method having the steps of: (A) monitoring packet-based traffic in a mobile-communications network to identify, as a malicious wireless terminal, a wireless terminal that exhibits specified behavior; (B) in response to the identification, linking the wireless terminal to a remediation manager; and (C) treating the wireless terminal via the link with the remediation manager to disable a cause of the specified behavior, wherein said cause comprises malware.

BRIEF DESCRIPTION OF THE DRAWINGS

Other aspects, features, and benefits of various embodiments of the invention will become more fully apparent, by way of example, from the following detailed description and the accompanying drawings, in which:

FIG. 1 shows a block diagram of a representative mobile-communications network in which various embodiments of the invention can be practiced; and FIG. 2 shows a flowchart of a communication method that can be used in the mobile-communications network of FIG. 1 according to one embodiment of the invention.

DETAILED DESCRIPTION

FIG. 1 shows a block diagram of a representative mobile-communications network 100 in which various embodiments of the invention can be practiced. Also shown in FIG. 1 is a mobile terminal 102, which can be a smart phone, a network-enabled laptop, a personal digital assistant, or any other suitable mobile device. Mobile terminal 102 is able to access, via a wireless link 104, various services provided by network 100, but is not considered to be a part of the network. One skilled in the art will appreciate that network 100 can provide services to one or more additional mobile terminals (not explicitly shown in FIG. 1) analogous to mobile terminal 102.

Mobile-communications network 100 is illustratively shown as being interfaced with two external networks, i.e., a circuit-switched network 126 and an IP (Internet Protocol) network 136. Similar to mobile terminal 102, networks 126 and 136 are external entities that are not parts of mobile-communications network 100. One skilled in the art will understand that, in various configurations, mobile-communications network 100 can be interfaced with fewer or more than two external networks. In various embodiments, network 100 can be a UMTS (Universal Mobile Telecommunications System) network, an LTE (Long Term Evolution) network, an EVDO (Evolution-Data Optimized or Evolution-Data only)-enabled network, any of different variants of other 2.5G/3G/4G mobile-communications networks, or any other suitable mobile-communications network.

Mobile-communications network 100 has a core network 150 that serves to operatively interconnect various entities of the network that enable its operation. Note that, for clarity, FIG. 1 shows only those network entities that are relevant to the description of various embodiments of the invention. One skilled in the art will understand that mobile-communications network 100 in general and core network 150 in particular may have additional entities not explicitly shown in FIG. 1.

In terms of the functionality, mobile-communications network 100 can be viewed as comprising two subsystems, e.g., a circuit-switched subsystem 120 and a packet-switched subsystem 130. Circuit-switched subsystem 120 carries data in a circuit-switched manner, e.g., by establishing a permanent channel for the duration of the call or communication session. Packet-switched subsystem 130 is designed to carry data in packets, which are routed according to their destination and transmitted over a shared transmission medium in an appropriate division-multiplexed manner. Mobile-communications network 100 also has some elements that are shared by both of subsystems 120 and 130, e.g., as further explained below. In some embodiments of mobile-communications network 100, e.g., those capable of using Voice over IP (VoIP) for voice services, circuit-switched subsystem 120 is optional.

Circuit-switched subsystem 120 bridges mobile-communications network 100 to circuit-switched network 126. In various embodiments, circuit-switched network 136 can be an Integrated Services Digital Network (ISDN) or a Public Switched Telephone Network (PSTN). In a representative configuration, circuit-switched subsystem 120 supports one or more of the following exemplary functions: (1) routing voice calls, SMS (Short Message Service) messages, and other circuit-switched data services; (2) setting up and releasing end-to-end circuit-switched connections; (3) handling mobility and hand-over requirements during the call or circuit-switched data session; and (4) billing. For example, in an embodiment in which mobile-communications network 100 is a UMTS network, circuit-switched subsystem 120 comprises one or more mobile switching centers (MSCs) and at least one gateway MSC (G-MSC) at the interface between the circuit-switched subsystem and circuit-switched network 126.

Packet-switched subsystem 130 bridges mobile-communications network 100 to IP network 136 (e.g., the Internet) and is configured to control, according to a specified policy, the packet-transmission-based data service(s) offered by the mobile-communications network to mobile terminal 102. In a representative configuration, packet-switched subsystem 130 supports one or more of the following exemplary functions: (1) routing data packets; (2) mobility management; (3) session management; (4) interaction between certain entities of mobile-communications network 100; and (5) billing. For example, when mobile terminal 102 attaches to packet-switched subsystem 130, the packet-switched subsystem generates and updates mobility-management information to track the location of the mobile terminal, which enables the mobile-communications network to properly route and deliver the data packets directed to the mobile terminal, e.g., from IP network 136. Packet-switched subsystem 130 also handles the inter-working between mobile-communications network 100 and IP network 136, and can be considered as a rather sophisticated routing entity. Packet-switched subsystem 130 manages data sessions, e.g., by providing the required quality of service (QoS) and handling the PDP contexts. Using core network 150, packet-switched subsystem 130 is able to communicate with other entities of mobile-communications network 100, including those in circuit-switched subsystem 120. Packet-switched subsystem 130 assists in generating the billing records for mobile terminal 102, e.g., by monitoring and recording the volume of data transmissions to and from the mobile terminal. In an embodiment in which mobile-communications network 100 is a UMTS network, packet-switched subsystem 130 comprises at least one Serving GPRS Support Node (SGSN) and at least one Gateway GPRS Support Node (GGSN), where GPRS stands for General Packet Radio Service.

Mobile terminal 102 interfaces with mobile-communications network 100 via an access node 110, the functionality of which can be used by both circuit-switched subsystem 120 and packet-switched subsystem 130. In addition to the access node 110 shown in FIG. 1, mobile-communications network 100 typically has a plurality of additional access nodes 110 (not explicitly shown in FIG. 1). In a representative embodiment, access node 110 includes a base-station transceiver (not explicitly shown) that maintains wireless link 104 with mobile terminal 102. Access node 110 further includes a radio controller (not explicitly shown) that controls the base-station transceiver. The radio controller typically performs radio-resource management and certain mobility-management functions. The radio controller is also the point at which data encryption/decryption may be performed to protect the data, e.g., from eavesdropping. In an embodiment in which mobile-communications network 100 is a UMTS network, access node 110 is part of the UTRAN (UMTS Terrestrial Radio Access Network) and comprises at least one Node B and at least one Radio Network Controller (RNC).

Mobile-communications network 100 further includes a subscription-and-policy unit 160, an intrusion-detection-services (IDS) unit 170, and a remediation-management unit 180, all connected to core network 150. Subscription-and-policy unit 160 stores and manages the subscription and policy information corresponding to individual users (subscriber profiles) and, when appropriate or necessary, supplies the relevant information from the subscriber profiles to appropriate entities of mobile-communications network 100. For example, all traffic corresponding to mobile terminal 102 is handled by the corresponding entities of mobile-communications network 100 based on and in compliance with the information and policies specific to that mobile terminal, as specified by subscription-and-policy unit 160. IDS unit 170 monitors and analyzes the network traffic and signaling data to detect anomalies and irregularities and identify infected or misbehaving mobile terminals. Remediation-management unit 180 performs remote treatment of and software updates for the identified mobile terminals. Note that, in a representative embodiment, remediation-management unit 180 is directly connected to both core network 150 and IP network 136, as indicated in FIG. 1. Additional description of the functionality of subscription-and-policy unit 160, IDS unit 170, and remediation-management unit 180 is given below in reference to FIG. 2.

FIG. 2 shows a flowchart of a communication method 200 that can be used in mobile-communications network 100 according to one embodiment of the invention. Method 200 is described in reference to both FIGS. 1 and 2. The description assumes that mobile terminal 102 is a malicious (e.g., malware-infected) device that has gained access to mobile-communications network 100 through access node 110 and attempts to perform illegal actions, e.g., actions that violate security policies, security practices, and/or use policies.

At step 202 of method 200, IDS unit 170 determines that mobile terminal 102 is a malicious device. To make this determination, IDS unit 170 monitors data packets that are transported through packet-switched subsystem 130 between the corresponding access nodes (such as access node 110) and IP network 136. In a representative configuration, IDS unit 170 has a communication link with a gateway node (e.g., GGSN, not explicitly shown) of packet-switched subsystem 130 established over core network 150. Using this communication link, the gateway node supplies and IDS unit 170 receives all relevant or requested packet-traffic information. IDS unit 170 analyzes the received packet-traffic information using any suitable IDS technique(s), e.g., those based on distinct counting of port numbers, IP addresses, or any selected packet-header attributes and/or on deep packet inspection (DPI). Based on the analysis, IDS unit 170 can detect common behaviors of malicious processes, such as port scanning, PDP-context spoofing, command-and-control activity in the form of peer-to-peer or fast-flux actions, vulnerability probing to or from an end-point, pseudo-random scanning for infected systems, DNS MX record searching, SMTP hosting, and spam broadcasting to SMTP servers, where DNS, MX, and SMTP stand for Domain Name System, Mail Exchanger, and Simple Mail Transfer Protocol, respectively. If the analysis implicates mobile terminal 102 as a host of a malicious process, then IDS unit 170 identifies mobile terminal 102 as a malicious device. Representative intrusion-detection techniques that can be adapted for use in IDS unit 170 are disclosed, e.g., in U.S. Pat. Nos. 7,701,945, 7,640,585, 7,565,693, 7,496,962, and 7,295,831, all of which are incorporated herein by reference in their entirety.

At step 204, IDS unit 170 sends one or more messages to subscription-and-policy unit 160 and remediation-management unit 180 to alert them that mobile terminal 102 has been identified as a malicious device. It is important that the message(s) sent to remediation-management unit 180 identify mobile terminal 102 by one or more of its non-IP identifiers, such as the IMSI (International Mobile Subscriber Identity).

At step 206, in response to the message(s) received at step 204, subscription-and-policy unit 160 changes the subscriber profile associated with mobile terminal 102 to a specified quarantine state. The change affects the type and/or level of services provided by mobile-communications network 100 to mobile terminal 102 and is designed to isolate the mobile terminal and effectively shut down its illegal activities. More specifically, one or more of the following changes can be implemented to effect a quarantine state: (1) reduce the maximum data-transmission rate available to the mobile terminal on the default bearer to a relatively low preset value; (2) redirect all traffic corresponding to the mobile terminal through a special dedicated portal, server, or router; (3) change the source IP address for the mobile terminal to one selected from a reserved subnet and optionally make the new IP address static; (4) add filters to limit the external domain(s) that the mobile terminal can access; and (5) modify firewall settings corresponding to the mobile terminal.

At step 208, subscription-and-policy unit 160 instructs the appropriate entities of packet-switched subsystem 130 to apply the changes made at step 206 to the packet-based data traffic corresponding to mobile terminal 102. Depending on the particular embodiment of mobile-communications network 100, the execution of step 208 may include multiple messages exchanged between several pertinent entities of packet-switched subsystem 130.

For example, FIG. 5.4.2.1-1: Bearer Modification Procedure with Bearer QoS Update, in technical specification 3GPP TS 23.401 V9.4.0 (2010-03) published by the 3rd Generation Partnership Project (3GPP), shows an exemplary flow of messages that can be used at step 208 to rate-limit mobile terminal 102 in an embodiment in which mobile-communications network 100 is an LTE network. Briefly, this flow comprises a total of at least twelve messages transmitted between (1) the PCRF (Policy and Charging Rules Function) and the PDN (Packet Data Network) gateway; (2) the PDN gateway and the serving gateway; (3) the serving gateway and the MME (Mobility Management Entity); (4) the MME and the enhanced Node B (eNodeB) entity; and (5) the eNodeB entity and the user equipment (UE, e.g., mobile terminal 102). For additional details on the individual messages of this flow, the reader is referred to technical specification 3GPP TS 23.401 V9.4.0 (2010-03), which is incorporated herein by reference in its entirety. Note that, in this embodiment, the PCRF is a sub-unit of subscription-and-policy unit 160; the PDN gateway, the serving gateway, and the MME are parts of packet-switched subsystem 130; and the eNodeB entity is a component of access node 110.

As another example, in an embodiment in which mobile-communications network 100 is a UMTS network, step 208 comprises the HSS (Home Subscriber Server) sending a cancel-location command to the SGSN (Serving GPRS Support Node). Executing this command, the SGSN terminates any ongoing packet-based data sessions for mobile terminal 102. Note that any ongoing circuit-switched sessions (e.g., phone calls) that are being handled for mobile terminal 102 by circuit-switched subsystem 120 can remain mostly unaffected (e.g., uninterrupted). The HSS also updates, based on the changes made at step 206, the APN (Access Point Name) and subscriber-profile information with the SGSN. When mobile terminal 102 tries to reattach to packet-switched subsystem 130, the new APN and subscriber-profile information are in effect, thereby changing the type and/or level of services provided by mobile-communications network 100 to mobile terminal 102 to those specified at step 206. Note that, in this embodiment, the HSS is a subunit of subscription-and-policy unit 160, and the SGSN is a part of packet-switched subsystem 130.

At step 210, packet-switched subsystem 130 assigns a new IP address to mobile terminal 102, e.g., from a dedicated subnet, and connects the mobile terminal to remediation-management unit 180, e.g., via IP network 136. In one embodiment, packet-switched subsystem 130 is configured to route data packets with source IP addresses from the dedicated subnet so that the packets are directed to remediation-management unit 180 regardless of the actual destination IP address specified in the packet's header. Since, at step 204, mobile terminal 102 was identified to remediation-management unit 180 as a malicious device, the remediation-management unit expects the mobile terminal to link up for treatment. Note that, even if not all of the packet-based data traffic is directed from mobile terminal 102 to remediation-management unit 180, the rate limiting and other configuration changes implemented at steps 206 and 208 severely curtail the ability of the mobile terminal to continue to perform illegal actions. At the same time, the ability of mobile terminal 102 to send and receive packet-based data traffic enables remediation-management unit 180 to remotely treat the mobile terminal.

At step 212, remediation-management unit 180 remotely treats mobile terminal 102 using the connection established at step 210. The treatment procedure may include but is not limited to any of the following: (1) downloading remediation software to mobile terminal 102; (2) initiating memory and system scans at the mobile terminal to detect corrupted software, malware, and/or active malicious processes; (3) repairing or reinstalling the detected corrupted software; (4) terminating the active malicious processes; (5) deleting or quarantining the detected malware; (6) restoring the system and memory of the mobile terminal to a "clean" operational state; and (7) notifying the user about the treatment.

At step 214, remediation-management unit 180 notifies subscription-and-policy unit 160 and, optionally, IDS unit 170 about the results of the treatment procedure performed at step 212. If the treatment was successful, then subscription-and-policy unit 160 reverts the subscriber profile associated with mobile terminal 102 back to the initial state (i.e., the state prior to step 206) or to a specified default state.

At step 216, subscription-and-policy unit 160 instructs the appropriate entities of packet-switched subsystem 130 to apply the changes made at step 214 to the packet-switched data traffic corresponding to mobile terminal 102. The execution of step 216 is analogous to the execution of step 208, which is illustrated by the examples above. After the changes are effected, packet-switched subsystem 130 resumes normal operation with respect to mobile terminal 102.

As used in this specification, the term "malware," short for malicious software, refers to the software designed to infiltrate the operating or file system of a "smart" device without an informed consent of the owner. In the computer arts, this term is generally used to designate a variety of forms of hostile, intrusive, or annoying program code. Software is considered to be malware based on the perceived intent of the creator rather than on any specific features. Malware includes computer viruses, worms, Trojan horses, spyware, dishonest adware, crimeware, most rootkits, and other malicious and unwanted programs. In law, malware is sometimes referred to as a computer contaminant, e.g., as codified in several U.S. states, such as California and West Virginia. Malware should be distinguished from defective software, that is, software that has a legitimate purpose but contains harmful bugs. A malicious process is an instance of malware-program code that is being executed by the operating system of the host device.

While this invention has been described with reference to illustrative embodiments, this description is not intended to be construed in a limiting sense. For example, in certain embodiments, a malicious mobile terminal can be treated by the remediation manager without changes to the subscription and policy information corresponding to the terminal. Various modifications of the described embodiments, as well as other embodiments of the invention, which are apparent to persons skilled in the art to which the invention pertains are deemed to lie within the principle and scope of the invention as expressed in the following claims. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a network server, the machine becomes an apparatus for practicing the invention. When implemented on a general-purpose processor, the program code segments combine with the processor to provide a unique device that operates analogously to specific logic circuits.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Unless explicitly stated otherwise, each numerical value and range should be interpreted as being approximate as if the word "about" or "approximately" preceded the value or range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

What is claimed is:

1. A communication method, comprising:
   (A) monitoring packet-based traffic in a mobile-communications network to identify, as a malicious wireless terminal, a wireless terminal that exhibits specified behavior;
   (B) changing a subscriber profile maintained by the network for the wireless terminal to a quarantine state in response to the identification;
   (C) allowing the wireless terminal to operate in the quarantine state under the changed subscriber profile; and
   (D) treating the wireless terminal via a link with a remediation manager to disable a cause of the specified behavior, wherein step (D) comprises:
      (D1) downloading remediation software from the remediation manager to the wireless terminal;
      (D2) initiating a memory and/or system scan at the wireless terminal using the remediation software;
      (D3) repairing or reinstalling any corrupted software detected by the scan;
      (D4) terminating any active malicious processes detected by the scan;
      (D5) deleting or quarantining any malware detected by the scan; and
      (D6) restoring the system and/or the memory of the wireless terminal to a specified operational state.

2. The method of claim 1, wherein said cause comprises malware.

3. The method of claim 1, further comprising, after performing step (D), changing the subscriber profile from the quarantine state to a specified operational state.

4. The method of claim 3, wherein the specified operational state is an initial state that was in effect prior to the quarantine state.

5. The method of claim 1, further comprising configuring a packet-switched subsystem of the network to link the wireless terminal and the remediation manager via an IP network that is external to the mobile-communications network.

6. The method of claim 1, wherein step (A) comprises applying an intrusion-detection technique to detect network manifestations of a malicious process, wherein:
   the wireless terminal is a host device for the malicious process; and
   the network manifestations caused by the malicious process indicate existence of the specified behavior.

7. The method of claim 1, further comprising reserving a subnet of IP addresses for assignment exclusively to malicious wireless terminals.

8. The method of claim 7, further comprising assigning one of the reserved IP addresses to the identified malicious wireless terminal.

9. The method of claim 7, further comprising configuring a packet-switched subsystem of the network to route data packets with source IP addresses from the reserved subnet to a remediation manager regardless of actual destination IP addresses specified for said data packets.

10. The method of claim 1, wherein step (B) comprises one or more of:
    (B1) reducing a maximum data-transmission rate available to the identified malicious wireless terminal;
    (B2) changing a source IP address for the identified malicious wireless terminal to one selected from a reserved subnet;
    (B3) making the source IP address static;
    (B4) specifying a filter configuration that limits external domains accessible to the identified malicious wireless terminal via a packet-switched subsystem of the network; and
    (B5) modifying one or more firewall settings corresponding to the identified malicious wireless terminal to restrict the terminal's access to other networks connected to the mobile-communications network.

11. The method of claim 1, further comprising, after performing step (B), configuring a packet-switched subsystem of the network to redirect all packet-based traffic corresponding to the wireless terminal via a specified path.

12. The method of claim 11, wherein the specified path funnels the packet-based traffic corresponding to the wireless terminal to a dedicated portal or server that is configured for remotely treating the wireless terminal to remove a cause of the specified behavior.

13. The method of claim 1, further comprising, prior to performing step (C), terminating any ongoing packet-based sessions corresponding to the wireless terminal without dropping an ongoing phone call on the wireless terminal.

14. A mobile-communications network, comprising:
    one or more access nodes for wirelessly connecting one or more wireless terminals to the network;
    a packet-switched subsystem adapted to transport packet-based traffic corresponding to the one or more wireless terminals;
    an intrusion-detection-services (IDS) unit configured to monitor the packet-based traffic to identify wireless terminals that exhibit specified behavior;
    a subscription-and-policy unit configured to maintain a plurality of subscriber profiles;
    a core network that operatively couples the one or more access nodes, the packet-switched subsystem, the IDS unit, and the subscription-and-policy unit, wherein:
       in response to the IDS unit identifying a wireless terminal that exhibits specified behavior, the subscription-and-policy unit is configured to change a subscriber profile maintained therein for the identified wireless terminal to a quarantine state; and
       the packet-switched subsystem is configured to allow the identified wireless terminal to operate in the quarantine state under the changed subscriber profile; and
    a remediation manager configured to remotely treat the identified wireless terminal, via a link supported by the packet-switched subsystem, to remove a cause of the specified behavior, wherein the network is configured to:

download remediation software from the remediation manager to the wireless terminal;

initiate a memory and/or system scan at the wireless terminal using the remediation software;

cause the wireless terminal to repair or reinstall any corrupted software detected by the Scan;

terminate any active malicious processes detected by the scan;

cause the wireless terminal to delete or quarantine any malware detected by the scan; and restore the system and/or the memory of the wireless terminal to a specified operational state.

15. The mobile-communications network of claim 14, wherein the mobile-communications network is configured to assign IP addresses from a reserved subnet of IP addresses for assignment exclusively to malicious wireless terminals detected by the IDS unit, wherein the packet-switched subsystem is configured to route data packets with source IP addresses from the reserved subnet to a remediation manager regardless of actual destination IP addresses specified for said data packets.

16. The mobile-communications network of claim 14, further comprising a circuit-switched subsystem operatively coupled to the core network, wherein:

the packet-switched subsystem is configured to terminate any ongoing packet-based sessions corresponding to the identified wireless terminal; and the circuit-switched subsystem is configured to carry, without dropping, an ongoing phone call for the identified wireless terminal while said ongoing packet-based sessions are being terminated.

17. A communication method, comprising:
(A) monitoring packet-based traffic in a mobile-communications network to identify, as a malicious wireless terminal, a wireless terminal that exhibits specified behavior;
(B) changing a subscriber profile maintained by the network for the wireless terminal to a quarantine state in response to the identification; and
(C) allowing the wireless terminal to operate in the quarantine state under the changed subscriber profile, wherein step (B) comprises:
  (B1) reducing a maximum data-transmission rate available to the identified malicious wireless terminal;
  (B2) changing a source IP address for the identified malicious wireless terminal to one selected from a reserved subnet;
  (B3) making the source IP address static;
  (B4) specifying a filter configuration that limits external domains accessible to the identified malicious wireless terminal via a packet-switched subsystem of the network; and
  (B5) modifying one or more firewall settings corresponding to the identified malicious wireless terminal to restrict the terminal's access to other networks connected to the mobile-communications network.

* * * * *